(12) United States Patent
Liu

(10) Patent No.: US 9,369,250 B2
(45) Date of Patent: Jun. 14, 2016

(54) METHOD OF CONFIGURING AN APERIODIC SOUNDING REFERENCE SIGNAL

(75) Inventor: Jin Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 208 days.

(21) Appl. No.: 13/979,523

(22) PCT Filed: Nov. 8, 2011

(86) PCT No.: PCT/IB2011/003217
§ 371 (c)(1),
(2), (4) Date: Jul. 12, 2013

(87) PCT Pub. No.: WO2012/095694
PCT Pub. Date: Jul. 19, 2012

(65) Prior Publication Data
US 2013/0286994 A1    Oct. 31, 2013

(30) Foreign Application Priority Data

Jan. 12, 2011 (CN) .......................... 2011 1 0005956

(51) Int. Cl.
*H04L 5/00* (2006.01)
*H04W 28/18* (2009.01)
(Continued)

(52) U.S. Cl.
CPC .............. *H04L 5/0048* (2013.01); *H04L 5/001* (2013.01); *H04L 5/0085* (2013.01); *H04W 28/18* (2013.01); *H04W 24/00* (2013.01); *H04W 72/00* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 8,982,813 B2 * | 3/2015 | Kwon | H04L 5/0007 370/329 |
| 2009/0042615 A1 * | 2/2009 | Teo | H04W 7/0691 455/562.1 |

(Continued)

FOREIGN PATENT DOCUMENTS

| | | |
|---|---|---|
| CN | 101827444 A | 9/2010 |
| CN | 101877865 A | 11/2010 |

(Continued)

OTHER PUBLICATIONS

Huawei et al., "Configuration of aperiodic SRS," $3^{rd}$ Generation Partnership Project (3GPP), 3GPP TSG RAN WG1 meeting #63, R1105849, 5 pages, Jacksonville, USA, Nov. 15-19, 2010.

(Continued)

*Primary Examiner* — Jeffrey M Rutkowski
*Assistant Examiner* — Jonathan B Wood
(74) *Attorney, Agent, or Firm* — Fay Sharpe, LLP

(57) ABSTRACT

The present invention relates to a method of configuring an aperiodic sounding reference signal. In an embodiment of the method of configuring an aperiodic sounding reference signal, the parameters of the aperiodic sounding reference signal are categorized into two parts. The first part of parameters can be configured by radio resource control signaling, and the second part can be configured dynamically via the indication in downlink control information format 4. The second part of the parameters includes at most three of the following parameter set: cyclic shift, the number of antenna ports, carrier aggregation, sounding reference signal bandwidth, frequency-domain position, sounding reference signal hopping bandwidth, multi-shot sounding reference signal duration, and transmission comb. The first part of the parameters includes sounding reference signal configuration index and the remaining part of the parameter set. With the method of the present invention, the second part of the parameters of an aperiodic sounding reference signal can be flexibly configured to adapt to various application scenarios.

13 Claims, 1 Drawing Sheet

(51) Int. Cl.
*H04W 24/00* (2009.01)
*H04W 72/00* (2009.01)
*H04W 88/08* (2009.01)

(56) References Cited

U.S. PATENT DOCUMENTS

| | | | | |
|---|---|---|---|---|
| 2010/0080187 | A1* | 4/2010 | Papasakellariou | H04L 5/0051 370/329 |
| 2010/0246561 | A1* | 9/2010 | Shin | H04W 52/32 370/345 |
| 2011/0085458 | A1* | 4/2011 | Montojo | H04L 1/0038 370/252 |
| 2011/0171964 | A1* | 7/2011 | Lin | H04L 5/0023 455/450 |
| 2011/0176480 | A1* | 7/2011 | Dahlman | H04L 5/0051 370/328 |
| 2011/0199944 | A1* | 8/2011 | Chen | H04L 5/0007 370/280 |
| 2011/0228731 | A1* | 9/2011 | Luo | H01Q 3/2605 370/329 |
| 2011/0243079 | A1* | 10/2011 | Chen | H04B 7/063 370/329 |
| 2011/0268028 | A1* | 11/2011 | Stern-Berkowitz | H04L 27/2613 370/328 |
| 2011/0310818 | A1* | 12/2011 | Lin | H04W 72/042 370/329 |
| 2012/0014349 | A1* | 1/2012 | Chung | H04B 7/0684 370/329 |
| 2012/0039273 | A1* | 2/2012 | Nam | H04L 5/0005 370/329 |
| 2012/0093119 | A1* | 4/2012 | Kim | H04L 27/2613 370/329 |
| 2012/0170497 | A1* | 7/2012 | Zhang | H04W 76/048 370/311 |
| 2012/0195292 | A1* | 8/2012 | Ko | H04L 1/0027 370/336 |
| 2012/0257582 | A1* | 10/2012 | Damnjanovic | H04L 5/001 370/329 |
| 2013/0078913 | A1* | 3/2013 | Lee | H04L 5/0007 455/39 |
| 2013/0128855 | A1* | 5/2013 | Noh | H04W 72/0453 370/329 |
| 2013/0156014 | A1* | 6/2013 | Kim | H04L 5/0051 370/336 |
| 2013/0182674 | A1* | 7/2013 | Lunttila | H04L 5/001 370/329 |
| 2013/0194908 | A1* | 8/2013 | Gao | H04L 5/0048 370/203 |
| 2013/0235756 | A1* | 9/2013 | Seo | H04L 1/0026 370/252 |
| 2013/0242911 | A1* | 9/2013 | Heo | H04W 72/0413 370/329 |
| 2013/0294353 | A1* | 11/2013 | Han | H04L 5/001 370/329 |
| 2013/0294381 | A1* | 11/2013 | Wang | H04L 5/0048 370/329 |
| 2014/0036859 | A1* | 2/2014 | Ekpenyong | H04W 72/042 370/330 |
| 2014/0071909 | A1* | 3/2014 | Frenne | H04W 72/0406 370/329 |

FOREIGN PATENT DOCUMENTS

| | | |
|---|---|---|
| CN | 101917765 | 12/2010 |
| JP | 2011-083746 | 4/2011 |
| WO | WO 2010/126852 A1 | 11/2010 |

OTHER PUBLICATIONS

International Search Report for PCT/IB2011/003217 dated Jul. 26, 2012.

* cited by examiner

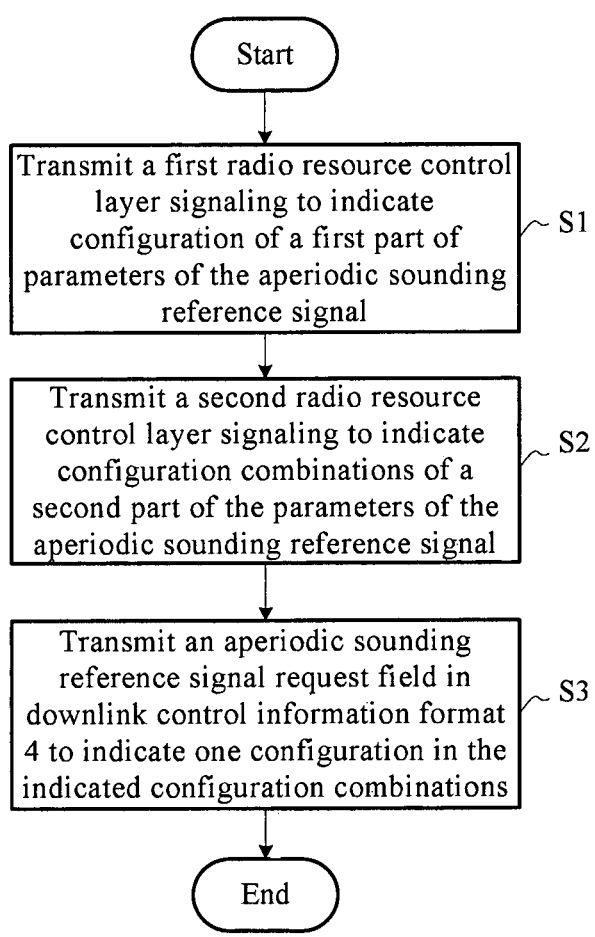

METHOD OF CONFIGURING AN APERIODIC SOUNDING REFERENCE SIGNAL

FIELD OF THE INVENTION

The present invention relates to mobile communication technology, and more particularly, to a method of configuring an aperiodic sounding reference signal at a base station in a mobile communication system.

BACKGROUND OF THE INVENTION

An LTE system can be laterally divided into three layers: physical layer, data link layer, and network higher layer. The physical layer provides its higher layer with data transmission service. The data link layer can be divided into MAC sub-layer, RLC sub-layer, and two service-dependent sub-layers: PDCP protocol layer and BMC protocol layer. The network higher layer is radio resource control (RRC) layer.

In the current LTE standards (RANI #63), the following agreements on aperiodic sounding reference signal (SRS) of downlink control information (DCI) format 4 have been reached:

Two bits are added for sounding reference signal triggering and parameter configuration. The two bits can indicate four states: one indicates no aperiodic sounding reference signal activation and the other three are used to indicate three sets of RRC-configured aperiodic sounding reference signal transmission parameters. And each of the three sets can indicate a combination of the following sounding reference signal parameters: sounding reference signal bandwidth (srsBandwidth), frequency-domain position, sounding reference signal hopping bandwidth (srs Hopping Bandwidth), transmission comb, cyclic shift, duration, and number of antenna ports. In addition, the parameter of sounding reference signal hopping bandwidth is valid when hopping is supported, and the parameter of duration is valid when multi-shot SRS is supported. The other SRS parameters are directly configured by the radio resource control layer.

The parameter of sounding reference signal configuration index (srsConfiguraitonIndex) is signaled directly by the radio resource control layer and is common for all sets of aperiodic sounding reference signal transmission parameters.

It is under investigation whether the number and the index of component carriers (CC) should be indicated by downlink control information format 4.

Aperiodic sounding reference signal triggering information of two bits is always present in downlink control information format 4.

In the prior art, a combination of some sounding reference signal parameters is predefined for dynamic configuration via the three states of downlink control information format 4. Due to the limited number of the states, both the number of parameters in the combination and the adjustable range of each parameter are constrained, thus restricting the flexibility of dynamic configuration of sounding reference signal parameters.

SUMMARY OF THE INVENTION

To solve the aforementioned problem, the present invention provides a flexible mechanism of configuring aperiodic sounding reference signal parameters, which categorizes the aperiodic sounding reference signal parameters into two parts. The first part of parameters can be configured by radio resource control signaling, and the second part can be configured dynamically via the indication in downlink control information format 4.

In an embodiment of the present invention, a method of configuring an aperiodic sounding reference signal by a base station in a mobile communication system is provided. The method includes: S1. transmitting a first radio resource control layer signaling to indicate configuration of a first part of parameters of the aperiodic sounding reference signal; S2. transmitting a second radio resource control layer signaling to indicate configuration combination of a second part of the parameters of the aperiodic sounding reference signal; S3. transmitting an aperiodic sounding reference signal request field in downlink control information format 4 to indicate one configuration in the indicated configuration combinations. The second part of the parameters includes at most three of the following parameter set: cyclic shift, the number of antenna ports, carrier aggregation, sounding reference signal bandwidth, frequency-domain position, sounding reference signal hopping switch, sounding reference signal hopping bandwidth, multi-shot sounding reference signal duration, and transmission comb. And the first part of the parameters includes sounding reference signal configuration index and the remaining part of the parameter set.

With the method of the present invention, the second part of the parameters of an aperiodic sounding reference signal can be flexibly configured so as to adapt to various application scenarios.

BRIEF DESCRIPTION OF THE DRAWINGS

Other features, objectives and advantages of the present invention will become more apparent after reading the following detailed description of non-limiting embodiments, with reference to the accompanying drawings, wherein below:

FIG. 1 is a flowchart illustrating a method of configuring an aperiodic sounding reference signal by a base station in a mobile communication system according to an embodiment of the present invention;

Identical or similar reference signs represent corresponding features throughout the drawings.

DETAILED DESCRIPTION OF PREFERRED EMBODIMENTS

A person skilled in the art would understand that a base station may have different specific name in different protocol standards. For example, in an LTE or LTE-A system, a base station is also called a node B or an evolved node B (eNB). Consequently, a base station mentioned in this disclosure is, for example, but not limited to, an eNB in an LTE-A system.

FIG. 1 is a flowchart illustrating a method of configuring an aperiodic sounding reference signal by a base station in a mobile communication system according to an embodiment of the present invention. As shown, the method includes steps of S1, S1 and S3. The method can be employed in any eNB for configuring an aperiodic sounding reference signal of a UE under its control.

In step S1, the eNB transmits a first radio resource control layer signaling to indicate configuration of a first part of parameters of the aperiodic sounding reference signal.

In step S2, the eNB transmits a second radio resource control layer signaling to indicate configuration combinations of a second part of parameters of the aperiodic sounding reference signal.

In step S3, the eNB transmits an aperiodic sounding reference signal request field in downlink control information format 4 to indicate one configuration in the indicated configuration combinations.

The second part of the parameters includes at most three of the following parameter set: cyclic shift, the number of antenna ports, carrier aggregation, sounding reference signal bandwidth, frequency-domain position, sounding reference signal hopping switch, sounding reference signal hopping bandwidth, multi-shot sounding reference signal duration, and transmission comb; and the first part of the parameters includes sounding reference signal configuration index and the remaining part of the parameter set.

Configuration of the first part of the parameters and configuration combination of the second part of the parameters of the aperiodic sounding reference signal are relatively fixed, and steps S1 and S2 may be performed simultaneously every long time interval, such as 10 ms. The first and second radio resource control signalings may be an identical one. Through variations of the configuration combination of the second part of the parameters of the aperiodic sounding reference signal, flexible adaption to various application scenarios can be achieved. Each configuration combination includes one or more configurations.

Based on the configuration combinations indicated by the second radio resource control signaling, specific configuration of the second part of the parameters of the aperiodic sounding reference signal is indicated by the eNB in step S3 by transmitting an aperiodic sounding reference signal request field in downlink control information format 4. As has been agreed on, the aperiodic sounding reference signal request field in downlink control information format 4 has a length of two bits, which indicate three different configurations as well as a case where no aperiodic sounding reference signal is utilized. Correspondingly, each configuration combination may include three different configurations. Step S3 may be performed dynamically, or more frequently. For example, step S3 may be performed in every transmission time internal (TTI). Since the number of the parameters relating to each configuration combination of the second part of the parameters of the aperiodic sounding reference signal is three at most, a more precise configuration of the aperiodic sounding reference signal, as compared to the prior art, may be realized.

In an embodiment of the present invention, steps S1, S2 and S3 in the above method are performed individually per component carrier.

In another embodiment of the present invention, steps S1, S2 and S3 in the above method are performed commonly for a plurality of component carriers, such as two component carriers, three component carriers, or all of the five component carriers.

In an embodiment of the present invention, the indicated configuration combinations of the second part of the parameters of the aperiodic sounding reference signal in the above method are one of combination 1, combination 2, combination 3, combination 4, combination 5, combination 6, combination 7, combination 8, and combination 9.

The second part of the parameters corresponding to combination 1 includes cyclic shift. And combination 1 corresponds to a scenario of a single antenna and a single component carrier, or a scenario where cyclic shift is prioritized. Correspondingly, the first part of the parameters includes: sounding reference signal configuration index, the number of antenna ports, carrier aggregation, sounding reference signal bandwidth, frequency-domain position, sounding reference signal hopping switch, sounding reference signal hopping bandwidth, multi-shot sounding reference signal duration, and transmission comb. Combination 1 includes the following three configurations:

State 1, wherein the aperiodic sounding reference signal is triggered and the cyclic shift of the aperiodic sounding reference signal is a cyclic shift indicator configured by the radio resource control layer;

State 2, wherein the aperiodic sounding reference signal is triggered and the cyclic shift of the aperiodic sounding reference signal is a cyclic shift indicator configured by the radio resource control layer and is offset by a first shift offset;

State 3, wherein the aperiodic sounding reference signal is triggered and the cyclic shift of the aperiodic sounding reference signal is a cyclic shift indicator configured by the radio resource control layer and is offset by a second shift offset.

The specific values of the first and second shift offsets may be predefined, or be configured by the radio resource control layer. In addition, it may be configured individually per component carrier, or be configured commonly for a plurality of component carriers.

In combination 1, the UE is notified, via radio resource control signaling, of whether the aperiodic sounding reference signal is transmitted from one antenna port, all of the antenna ports, or half of the antenna ports, and whether it is transmitted on one uplink component carrier, all uplink component carriers, or a subset thereof, and these are common for all states.

The second part of the parameters corresponding to combination 2 includes cyclic shift and the number of antenna ports. Combination 2 corresponds to a scenario of a single component carrier or multiple antennas, or a scenario where cyclic shift and the number of antenna ports are prioritized. Correspondingly, the first part of the parameters includes: sounding reference signal configuration index, carrier aggregation, sounding reference signal bandwidth, frequency-domain position, sounding reference signal hopping switch, sounding reference signal hopping bandwidth, multi-shot sounding reference signal duration, and transmission comb. Combination 2 includes the following three configurations:

State 1, wherein the aperiodic sounding reference signal is triggered from only one antenna port and the cyclic shift of the aperiodic sounding reference signal is a cyclic shift indicator configured by the radio resource control layer;

State 2, wherein the aperiodic sounding reference signal is triggered from only one antenna port and the cyclic shift of the aperiodic sounding reference signal is a cyclic shift indicator configured by the radio resource control layer and is offset by a shift offset;

State 3, wherein the aperiodic sounding reference signal is triggered from all or half of the antenna ports and the cyclic shift of the aperiodic sounding reference signal is a cyclic shift indicator configured by the radio resource control layer;

Or state 3', wherein the aperiodic sounding reference signal is triggered from all or half of the antenna ports and the cyclic shift of the aperiodic sounding reference signal is a cyclic shift indicator configured by the radio resource control layer and is offset by a shift offset.

The cyclic shift indicator (CSI) configured by the radio resource control corresponds to antenna port 0, and the CSI of other antenna ports can be derived from the number of active antenna ports of the aperiodic sounding reference signal.

The specific value of the shift offset may be predefined, or be configured by the radio resource control layer. In addition, it may be configured individually per component carrier, or be configured commonly for a plurality of component carriers.

State 3 includes two alternative situations, and so does state 3'. This means that there are four alternative implementations of combination 2. In combination 2, the UE is notified, via radio resource control signaling, of whether the aperiodic sounding reference signal is transmitted on one uplink component carrier, all uplink component carriers or a subset thereof, and it is common for all states. The CSI and the cyclic shift offset may be configured, via radio resource control signaling, individually per component carrier to achieve more flexibility, or commonly for all component carriers or a subset thereof to conserve radio resource control signaling overhead.

The second part of the parameters corresponding to combination 3 includes cyclic shift and carrier aggregation. And combination 3 corresponds to a scenario of a single antenna, or a scenario where cyclic shift and carrier aggregation are prioritized. Correspondingly, the first part of the parameters includes: sounding reference signal configuration index, the number of antenna ports, sounding reference signal bandwidth, frequency-domain position, sounding reference signal hopping switch, sounding reference signal hopping bandwidth, multi-shot sounding reference signal duration, and transmission comb. Combination 3 includes the following three configurations:

State 1, wherein the aperiodic sounding reference signal is triggered on one uplink component carrier and the cyclic shift of the aperiodic sounding reference signal is a cyclic shift indicator configured by the radio resource control layer;

State 2, wherein the aperiodic sounding reference signal is triggered on one uplink component carrier and the cyclic shift of the aperiodic sounding reference signal is a cyclic shift indicator configured by the radio resource control layer and is offset by a shift offset; in a case where four of the eight cyclic shifts and two separations have been configured for four antenna ports via radio resource signaling, for four antenna ports, the cyclic shift offset is set to be 1; and in a case where two of the eight cyclic shifts and four separations have been configured for two antenna ports via radio resource signaling, the cyclic shift offset is set to be 2 for the two antenna ports to achieve maximum separation;

State 3, wherein the aperiodic sounding reference signal is triggered on all activated uplink component carriers or a subset thereof and the cyclic shift of the aperiodic sounding reference signal is a cyclic shift indicator configured by the radio resource control layer;

Or state 3', wherein the aperiodic sounding reference signal is triggered on all activated uplink component carriers or a subset thereof and the cyclic shift of the aperiodic sounding reference signal is a cyclic shift indicator configured by the radio resource control layer and is offset by a shift offset.

The specific value of the shift offsets may be predefined, or be configured by the radio resource control layer. In addition, it may be configured individually per component carrier, or be configured commonly for a plurality of component carriers.

State 3 includes two alternative situations, and so does state 3'. This means that there are four alternative implementations of combination 3. In combination 3, the UE is notified, via radio resource control signaling, of whether the aperiodic sounding reference signal is transmitted from one antenna port, all of the antenna ports, or half of the antenna ports, and the cyclic shift offset may be configured via radio resource signaling individually per component carrier to achieve more flexibility, or be implicitly indicated by unused code-points.

The second part of the parameters corresponding to combination 4 includes the number of antenna ports and carrier aggregation. Combination 4 corresponds to a scenario of multiple antennas or carrier aggregation, or a scenario where the number of antenna ports and carrier aggregation are prioritized. Correspondingly, the first part of the parameters includes: sounding reference signal configuration index, cyclic shift, sounding reference signal bandwidth, frequency-domain position, sounding reference signal hopping switch, sounding reference signal hopping bandwidth, multi-shot sounding reference signal duration, and transmission comb. Combination 4 includes the following three configurations:

State 1, wherein the aperiodic sounding reference signal is triggered from only one antenna port and on one uplink component carrier and the cyclic shift of the aperiodic sounding reference signal is a cyclic shift indicator configured by the radio resource control layer;

State 2, wherein the aperiodic sounding reference signal is triggered from all or half of the antenna ports and on one uplink component carrier and the cyclic shift of the aperiodic sounding reference signal is a cyclic shift indicator configured by the radio resource control layer;

State 3, wherein the aperiodic sounding reference signal is triggered from one antenna port and on all uplink component carriers or a subset thereof and the cyclic shift of the aperiodic sounding reference signal is a cyclic shift indicator configured by the radio resource control layer;

Or state 3', wherein the aperiodic sounding reference signal is triggered from all or half of the antenna ports and on all uplink component carriers or a subset thereof and the cyclic shift of the aperiodic sounding reference signal is a cyclic shift indicator configured by the radio resource control layer.

State 2 includes two alternative situations, state 3 includes three, and state 3' includes four. This means that there are 14 alternative implementations of combination 4. In combination 4, the CSI corresponds to antenna port 0, and may be configured individually per component carrier, or be configured commonly for all component carriers.

The second part of the parameters corresponding to combination 5 includes cyclic shift and transmission comb. Combination 5 corresponds to a scenario where cyclic shift and transmission comb are prioritized. Correspondingly, the first part of the parameters includes: sounding reference signal configuration index, the number of antenna ports, carrier aggregation, sounding reference signal bandwidth, frequency-domain position, sounding reference signal hopping switch, sounding reference signal hopping bandwidth, and multi-shot sounding reference signal duration. And combination 5 includes the following configurations:

State 1, wherein the aperiodic sounding reference signal is triggered, the cyclic shift of the aperiodic sounding reference signal is a cyclic shift indicator configured by the radio resource control layer, and the transmission comb of the aperiodic sounding reference signal is a transmission comb configured by the radio resource control layer;

State 2, wherein the aperiodic sounding reference signal is triggered, the cyclic shift of the aperiodic sounding reference signal is a cyclic shift indicator configured by the radio resource control layer and is offset by a cyclic shift offset, and the transmission comb of the aperiodic sounding reference signal is a transmission comb configured by the radio resource control layer;

State 3, wherein the aperiodic sounding reference signal is triggered, the cyclic shift of the aperiodic sounding reference signal is a cyclic shift indicator configured by the radio resource control layer, and the transmission comb of the aperiodic sounding reference signal is a transmission comb different from that configured by the radio resource control layer;

Or state 3', wherein the aperiodic sounding reference signal is triggered, the cyclic shift of the aperiodic sounding reference signal is a cyclic shift indicator configured by the radio resource control layer and is offset by a cyclic shift offset, and the transmission comb of the aperiodic sounding reference signal is a transmission comb different from that configured by the radio resource control layer.

State 3 and state 3' means that there are two alternative implementations of combination 5.

The second part of the parameters corresponding to combination 6 includes cyclic shift and hopping switch. Combination 6 corresponds to a scenario where cyclic shift and hopping are prioritized. Correspondingly, the first part of the parameters includes: sounding reference signal configuration index, the number of antenna ports, carrier aggregation, sounding reference signal bandwidth, frequency-domain position, sounding reference signal hopping bandwidth, multi-shot sounding reference signal duration, and transmission comb. And combination 6 includes the following configurations:

State 1, wherein the aperiodic sounding reference signal is triggered, the cyclic shift of the aperiodic sounding reference signal is a cyclic shift indicator configured by the radio resource control layer, and hopping is not adopted for the aperiodic sounding reference signal;

State 2, wherein the aperiodic sounding reference signal is triggered, the cyclic shift of the aperiodic sounding reference signal is a cyclic shift indicator configured by the radio resource control layer and is offset by a cyclic shift offset, and hopping is not adopted for the aperiodic sounding reference signal;

State 3, wherein the aperiodic sounding reference signal is triggered, the cyclic shift of the aperiodic sounding reference signal is a cyclic shift indicator configured by the radio resource control layer, and hopping is adopted for the aperiodic sounding reference signal;

Or state 3', wherein the aperiodic sounding reference signal is triggered, the cyclic shift of the aperiodic sounding reference signal is a cyclic shift indicator configured by the radio resource control layer and is offset by a cyclic shift offset, and hopping is adopted for the aperiodic sounding reference signal.

State 3 and state 3' means that there are two alternative implementations of combination 6.

The second part of the parameters corresponding to combination 7 includes the number of antenna ports and hopping switch. Combination 7 corresponds to a scenario where the number of antenna ports and hopping are prioritized. Correspondingly, the first part of the parameters includes: sounding reference signal configuration index, cyclic shift, carrier aggregation, sounding reference signal bandwidth, frequency-domain position, sounding reference signal hopping bandwidth, multi-shot sounding reference signal duration, and transmission comb. And combination 7 includes the following configurations:

State 1, wherein the aperiodic sounding reference signal is triggered, the number of antenna ports of the aperiodic sounding reference signal is the number of antenna ports configured by the radio resource control layer, and hopping is not adopted for the aperiodic sounding reference signal;

State 2, wherein the aperiodic sounding reference signal is triggered, the number of antenna ports of the aperiodic sounding reference signal is the number of antenna ports configured by the radio resource control layer, and hopping is not adopted for the aperiodic sounding reference signal;

State 3, wherein the aperiodic sounding reference signal is triggered, the number of antenna ports of the aperiodic sounding reference signal is the number of antenna ports configured by the radio resource control layer, and hopping is adopted for the aperiodic sounding reference signal;

Or state 3', wherein the aperiodic sounding reference signal is triggered, the number of antenna ports of the aperiodic sounding reference signal is the number of antenna ports configured by the radio resource control layer, and hopping is adopted for the aperiodic sounding reference signal.

State 3 and state 3' means that there are two alternative implementations of combination 7.

The second part of the parameters corresponding to combination 8 includes carrier aggregation and hopping switch. Combination 8 corresponds to a scenario where carrier aggregation and hopping are prioritized. Correspondingly, the first part of the parameters includes: sounding reference signal configuration index, cyclic shift, the number of antenna ports, sounding reference signal bandwidth, frequency-domain position, sounding reference signal hopping bandwidth, multi-shot sounding reference signal duration, and transmission comb. And combination 8 includes the following configurations:

State 1, wherein the aperiodic sounding reference signal is triggered, the carrier aggregation of the aperiodic sounding reference signal is carrier aggregation configured by the radio resource control layer, and hopping is not adopted for the aperiodic sounding reference signal;

State 2, wherein the aperiodic sounding reference signal is triggered, the carrier aggregation of the aperiodic sounding reference signal is carrier aggregation configured by the radio resource control layer, and hopping is not adopted for the aperiodic sounding reference signal;

State 3, wherein the aperiodic sounding reference signal is triggered, the carrier aggregation of the aperiodic sounding reference signal is carrier aggregation configured by the radio resource control layer, and hopping is adopted for the aperiodic sounding reference signal;

Or state 3', wherein the aperiodic sounding reference signal is triggered, the carrier aggregation of the aperiodic sounding reference signal is carrier aggregation configured by the radio resource control layer, and hopping is adopted for the aperiodic sounding reference signal.

State 3 and state 3' means that there are two alternative implementations of combination 8.

The second part of the parameters corresponding to combination 9 includes cyclic shift and sounding reference signal bandwidth. Combination 9 corresponds to a scenario where cyclic shift and bandwidth are prioritized. Correspondingly, the first part of the parameters includes: sounding reference signal configuration index, the number of antenna ports, carrier aggregation, frequency-domain position, sounding reference signal hopping switch, sounding reference signal hopping bandwidth, multi-shot sounding reference signal duration, and transmission comb. And combination 9 includes the following configurations:

State 1, wherein the aperiodic sounding reference signal is triggered, the cyclic shift of the aperiodic sounding reference signal is a cyclic shift indicator configured by the radio resource control layer, and the aperiodic sounding reference signal is a wide-band reference signal;

State 2, wherein the aperiodic sounding reference signal is triggered, the cyclic shift of the aperiodic sounding reference signal is a cyclic shift indicator configured by the radio resource control layer, and the aperiodic sounding reference signal is a narrow-band reference signal;

State 3, wherein the aperiodic sounding reference signal is triggered, the cyclic shift of the aperiodic sounding reference signal is a cyclic shift indicator configured by the radio resource control layer and is offset by a cyclic shift offset, and the aperiodic sounding reference signal is a wide-band reference signal;

Or state 3', wherein the aperiodic sounding reference signal is triggered, the cyclic shift of the aperiodic sounding reference signal is a cyclic shift indicator configured by the radio resource control layer and is offset by a cyclic shift offset, and the aperiodic sounding reference signal is a narrow-band reference signal.

State 3 and state 3' means that there are two alternative implementations of combination 9.

A person skilled in the art would understand that the above embodiments are exemplary rather than limiting. And different technical features in different embodiments may be combined to achieve desirable effects. Modified embodiments other than the disclosed embodiments may be understood and implemented by a person skilled in the art in light of the accompanying drawings, the specification and the appended claims. In the claims, any form of the term "comprise" doesn't exclude other devices or steps; the indefinite article "a" or "an" isn't intended to mean singular number; and the terms "first" or "second" serves to identify names rather than to indicate any particular order. Any reference signs in the claims cannot be construed as a limiting to the scope of the claims. And the functions of several parts in a claim may be implemented with a single hardware or software module. The mere fact that certain technical features exist in different dependent claims isn't intended to exclude the possibility that these technical features may be combined to achieve desirable effects.

The invention claimed is:

1. A method of configuring an aperiodic sounding reference signal by a base station in a mobile communication system, the method comprising:
    transmitting a first radio resource control layer signaling to indicate configuration of a first part of parameters of the aperiodic sounding reference signal;
    transmitting a second radio resource control layer signaling to pre-define sets of parameter value combinations of a second part of the parameter set of the aperiodic sounding reference signal;
    transmitting an aperiodic sounding reference signal request field in downlink control information format 4 to select one of the pre-defined sets of parameter value combinations;
    wherein the second part of the parameter set comprises at least one and at most three of the following parameters: cyclic shift, the number of antenna ports, carrier aggregation, sounding reference signal bandwidth, frequency-domain position, sounding reference signal hopping switch, sounding reference signal hopping bandwidth, multi-shot sounding reference signal duration, and transmission comb; and
    wherein the first part of the parameter set comprises sounding reference signal configuration index and the parameters of the parameter set that are not included in the second part of the parameters.

2. The method of claim 1, wherein transmitting a first radio resource control layer signaling to indicate configuration of the first part of the parameter set of the aperiodic sounding reference signal, transmitting a second radio resource control layer signaling to pre-define sets of a parameter value combinations of a second part of the parameter set of the aperiodic sounding reference signal and transmitting the aperiodic sounding reference signal request field in downlink control information format 4 to select one of the pre-defined sets of parameter value combinations are performed individually per component carrier.

3. The method of claim 1, wherein transmitting the first radio resource control layer signaling to indicate configuration of the first part of the parameter set of the aperiodic sounding reference signal, transmitting a second radio resource control layer signaling to pre-define sets of parameter value combinations of the second part of the parameter set of the aperiodic sounding reference signal and transmitting the aperiodic sounding reference signal request field in downlink control information format 4 to select one of the pre-defined sets of parameter value combinations are performed commonly for a plurality of component carriers.

4. The method of claim 1, wherein the pre-defined sets of parameter value combinations are parameter values of one of:
    combination 1, wherein the second part of the parameters corresponding to combination 1 comprises cyclic shift;
    combination 2, wherein the second part of the parameters corresponding to combination 2 comprises cyclic shift and the number of antenna ports;
    combination 3, wherein the second part of the parameters corresponding to combination 3 comprises cyclic shift and carrier aggregation;
    combination 4, wherein the second part of the parameters corresponding to combination 4 comprises the number of antenna ports and carrier aggregation;
    combination 5, wherein the second part of the parameters corresponding to combination 5 comprises cyclic shift and transmission comb;
    combination 6, wherein the second part of the parameters corresponding to combination 6 comprises cyclic shift and hopping switch;
    combination 7, wherein the second part of the parameters corresponding to combination 7 comprises the number of antenna ports and hopping switch;
    combination 8, wherein the second part of the parameters corresponding to combination 8 comprises carrier aggregation and hopping switch;
    combination 9, wherein the second part of the parameters corresponding to combination 9 comprises cyclic shift and bandwidth.

5. The method of claim 4, wherein the indicated pre-defined sets of parameter value combinations are combination 1, and the parameter value combinations of combination 1 indicate the following configurations:
    state 1, wherein the aperiodic sounding reference signal is triggered and the cyclic shift of the aperiodic sounding reference signal is a cyclic shift indicator configured by the radio resource control layer;
    state 2, wherein the aperiodic sounding reference signal is triggered and the cyclic shift of the aperiodic sounding reference signal is a cyclic shift indicator configured by the radio resource control layer and is offset by a first shift offset;
    state 3, wherein the aperiodic sounding reference signal is triggered and the cyclic shift of the aperiodic sounding reference signal is a cyclic shift indicator configured by the radio resource control layer and is offset by a second shift offset.

6. The method of claim 4, wherein the pre-defined sets of parameter value combinations are combination 2, and the parameter value combinations of combination 2 indicate the following configurations:
    state 1, wherein the aperiodic sounding reference signal is triggered from only one antenna port and the cyclic shift of the aperiodic sounding reference signal is a cyclic shift indicator configured by the radio resource control layer;
    state 2, wherein the aperiodic sounding reference signal is triggered from only one antenna port and the cyclic shift of the aperiodic sounding reference signal is a cyclic shift indicator configured by the radio resource control layer and is offset by a shift offset;

state 3, wherein the aperiodic sounding reference signal is triggered from all or half of the antenna ports and the cyclic shift of the aperiodic sounding reference signal is a cyclic shift indicator configured by the radio resource control layer;

or state 3', wherein the aperiodic sounding reference signal is triggered from all or half of the antenna ports and the cyclic shift of the aperiodic sounding reference signal is a cyclic shift indicator configured by the radio resource control layer and is offset by a shift offset.

7. The method of claim 4, wherein the pre-defined sets of parameter value combinations are combination 3, and the parameter value combinations of combination 3 indicate the following configurations:

state 1, wherein the aperiodic sounding reference signal is triggered on one uplink component carrier and the cyclic shift of the aperiodic sounding reference signal is a cyclic shift indicator configured by the radio resource control layer;

state 2, wherein the aperiodic sounding reference signal is triggered on one uplink component carrier and the cyclic shift of the aperiodic sounding reference signal is a cyclic shift indicator configured by the radio resource control layer and is offset by a shift offset;

state 3, wherein the aperiodic sounding reference signal is triggered on all activated uplink component carriers or a subset thereof and the cyclic shift of the aperiodic sounding reference signal is a cyclic shift indicator configured by the radio resource control layer;

or state 3', wherein the aperiodic sounding reference signal is triggered on all activated uplink component carriers or a subset thereof and the cyclic shift of the aperiodic sounding reference signal is a cyclic shift indicator configured by the radio resource control layer and is offset by a shift offset.

8. The method of claim 4, wherein the pre-defined sets of parameter value combinations are combination 4, and the parameter value combinations of combination 4 indicate the following configurations:

state 1, wherein the aperiodic sounding reference signal is triggered from one antenna port and on one uplink component carrier and the cyclic shift of the aperiodic sounding reference signal is a cyclic shift indicator configured by the radio resource control layer;

state 2, wherein the aperiodic sounding reference signal is triggered from all or half of the antenna ports and on one uplink component carrier and the cyclic shift of the aperiodic sounding reference signal is a cyclic shift indicator configured by the radio resource control layer;

state 3, wherein the aperiodic sounding reference signal is triggered from one antenna port and on at least two uplink component carriers and the cyclic shift of the aperiodic sounding reference signal is a cyclic shift indicator configured by the radio resource control layer;

or state 3', wherein the aperiodic sounding reference signal is triggered from all or half of the antenna ports and on at least two uplink component carriers and the cyclic shift of the aperiodic sounding reference signal is a cyclic shift indicator configured by the radio resource control layer.

9. The method of claim 4, wherein the pre-defined sets of parameter value combinations are combination 5, and the parameter value combinations of combination 5 indicate the following configurations:

state 1, wherein the aperiodic sounding reference signal is triggered, the cyclic shift of the aperiodic sounding reference signal is a cyclic shift indicator configured by the radio resource control layer, and the transmission comb of the aperiodic sounding reference signal is a transmission comb configured by the radio resource control layer;

state 2, wherein the aperiodic sounding reference signal is triggered, the cyclic shift of the aperiodic sounding reference signal is a cyclic shift indicator configured by the radio resource control layer and is offset by a cyclic shift offset, and the transmission comb of the aperiodic sounding reference signal is a transmission comb configured by the radio resource control layer;

state 3, wherein the aperiodic sounding reference signal is triggered, the cyclic shift of the aperiodic sounding reference signal is a cyclic shift indicator configured by the radio resource control layer, and the transmission comb of the aperiodic sounding reference signal is a transmission comb different from that configured by the radio resource control layer;

or state 3', wherein the aperiodic sounding reference signal is triggered, the cyclic shift of the aperiodic sounding reference signal is a cyclic shift indicator configured by the radio resource control layer and is offset by a cyclic shift offset, and the transmission comb of the aperiodic sounding reference signal is a transmission comb different from that configured by the radio resource control layer.

10. The method of claim 4, wherein the pre-defined sets of parameter value combinations are combination 6, and the parameter value of combinations of combination 6 indicate the following configurations:

state 1, wherein the aperiodic sounding reference signal is triggered, the cyclic shift of the aperiodic sounding reference signal is a cyclic shift indicator configured by the radio resource control layer, and hopping is not adopted for the aperiodic sounding reference signal;

state 2, wherein the aperiodic sounding reference signal is triggered, the cyclic shift of the aperiodic sounding reference signal is a cyclic shift indicator configured by the radio resource control layer and is offset by a cyclic shift offset, and hopping is not adopted for the aperiodic sounding reference signal;

state 3, wherein the aperiodic sounding reference signal is triggered, the cyclic shift of the aperiodic sounding reference signal is a cyclic shift indicator configured by the radio resource control layer, and hopping is adopted for the aperiodic sounding reference signal;

or state 3', wherein the aperiodic sounding reference signal is triggered, the cyclic shift of the aperiodic sounding reference signal is a cyclic shift indicator configured by the radio resource control layer and is offset by a cyclic shift offset, and hopping is adopted for the aperiodic sounding reference signal.

11. The method of claim 4, wherein the pre-defined sets of parameter value combinations are combination 7, and the parameter value combinations of combination 7 indicate the following configurations:

state 1, wherein the aperiodic sounding reference signal is triggered, the number of antenna ports of the aperiodic sounding reference signal is the number of antenna ports configured by the radio resource control layer, and hopping is not adopted for the aperiodic sounding reference signal;

or state 2, wherein the aperiodic sounding reference signal is triggered, the number of antenna ports of the aperiodic sounding reference signal is the number of antenna ports configured by the radio resource control layer, and hopping is adopted for the aperiodic sounding reference signal.

12. The method of claim 4, wherein the pre-defined sets of parameter value combinations are combination 8, and the parameter value combinations of combination 8 indicate the following configurations:
- state 1, wherein the aperiodic sounding reference signal is triggered, the carrier aggregation of the aperiodic sounding reference signal is carrier aggregation configured by the radio resource control layer, and hopping is not adopted for the aperiodic sounding reference signal;
- or state 2, wherein the aperiodic sounding reference signal is triggered, the carrier aggregation of the aperiodic sounding reference signal is carrier aggregation configured by the radio resource control layer, and hopping is adopted for the aperiodic sounding reference signal.

13. The method of claim 4, wherein the pre-defined sets of parameter value combinations are combination 9, and the parameter value combinations of combination 9 indicate the following configurations:
- state 1, wherein the aperiodic sounding reference signal is triggered, the cyclic shift of the aperiodic sounding reference signal is a cyclic shift indicator configured by the radio resource control layer, and the aperiodic sounding reference signal is a wide-band reference signal;
- state 2, wherein the aperiodic sounding reference signal is triggered, the cyclic shift of the aperiodic sounding reference signal is a cyclic shift indicator configured by the radio resource control layer, and the aperiodic sounding reference signal is a narrow-band reference signal;
- state 3, wherein the aperiodic sounding reference signal is triggered, the cyclic shift of the aperiodic sounding reference signal is a cyclic shift indicator configured by the radio resource control layer, is offset by a cyclic shift offset, and the aperiodic sounding reference signal is a narrow-band reference signal.

* * * * *